United States Patent
Kamm

[11] 3,785,065
[45] Jan. 15, 1974

[54] LANDSCAPE KIT
[76] Inventor: Walter E. Kamm, 514 S. College Ave., Claremont, Calif. 91711
[22] Filed: June 21, 1972
[21] Appl. No.: 264,884

[52] U.S. Cl. .................................. 35/16, 35/7 R
[51] Int. Cl. ........................................... G09b 25/04
[58] Field of Search .................. 35/7 R, 7 A, 16, 35/29 R, 73, 41; 46/17

[56] References Cited
UNITED STATES PATENTS

| 320,564 | 6/1885 | Klemm | 35/41 |
| 2,305,567 | 12/1942 | Bole | 35/16 |
| 2,526,569 | 10/1950 | Lewis | 35/16 |
| 2,545,409 | 3/1951 | McCall | 35/7 R X |
| 2,878,586 | 3/1959 | Ohlsson | 35/16 |
| 2,942,354 | 6/1960 | Grain | 35/16 X |
| 2,958,142 | 11/1960 | Kershaw | 35/16 |
| 3,261,126 | 7/1966 | Marks | 35/73 UX |

OTHER PUBLICATIONS
Dept. Agriculture – Misc. Publication No. 622, May 1947, "How to Use Paper Cutouts in Planning to Remodel House" pp. 2, 3, 25, inside rear cover relied on.

Primary Examiner—Harland S. Skogquist
Attorney—Jess M. Roberts

[57] ABSTRACT

Accurate small scale colored cardboard cutouts depicting shrubs and trees have base spikes for insertion into a base sheet of foamed plastic that is colored green to represent lawn areas. A white crayon may be used to coat the green base sheet to represent cement walks and driveways and a brown crayon may be used to represent the bare earth of planted areas. A swimming pool or a fish pond is shown by a blue crayon. The plan area of a house and garage may be depicted by a paper sheet cut to scale and adhesively bonded to the surface of the base sheet. Numerous plant cutouts are provided with individual indicia on the cutouts which refer to corresponding indicia on a descriptive list of available trees and shrubs.

14 Claims, 4 Drawing Figures

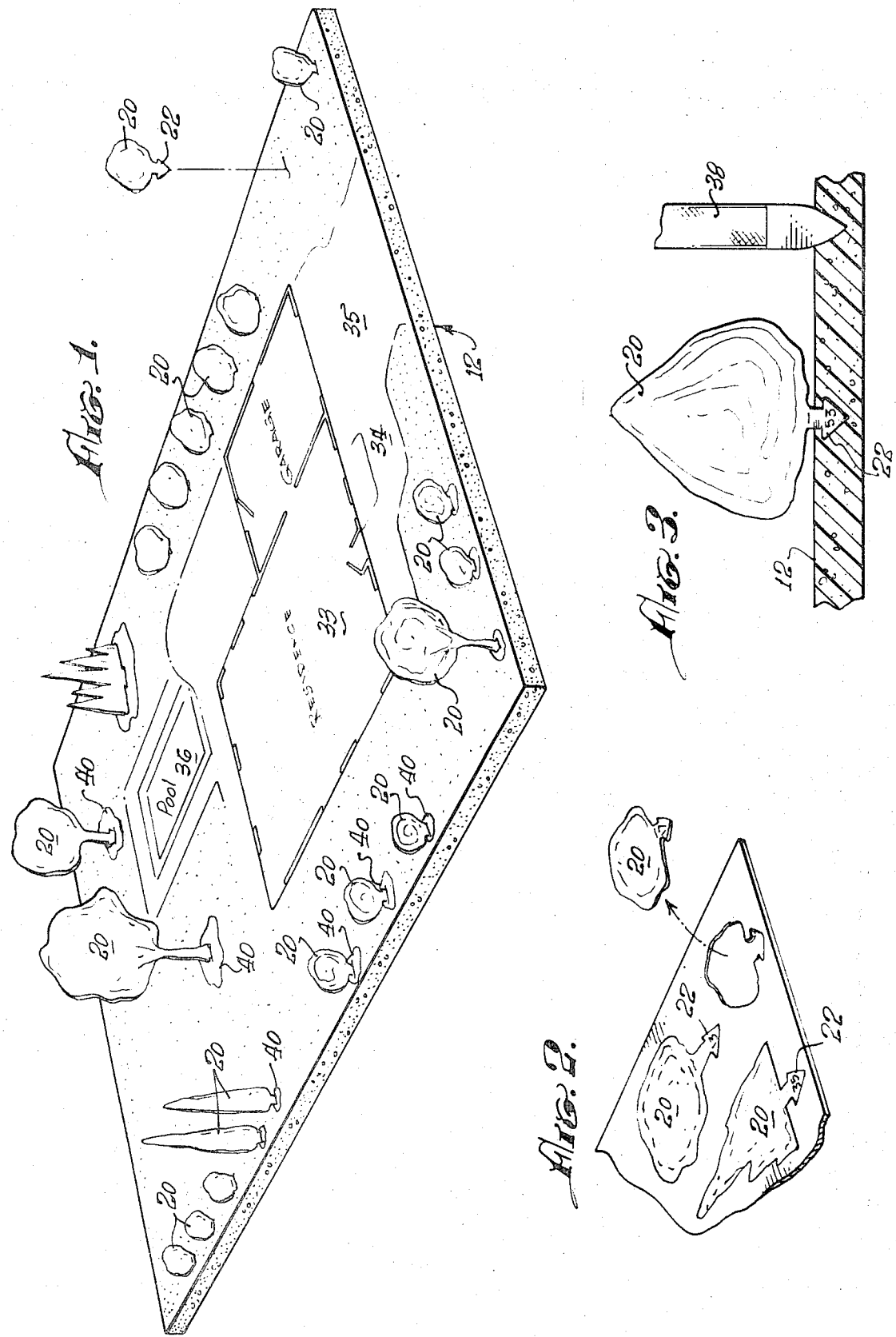

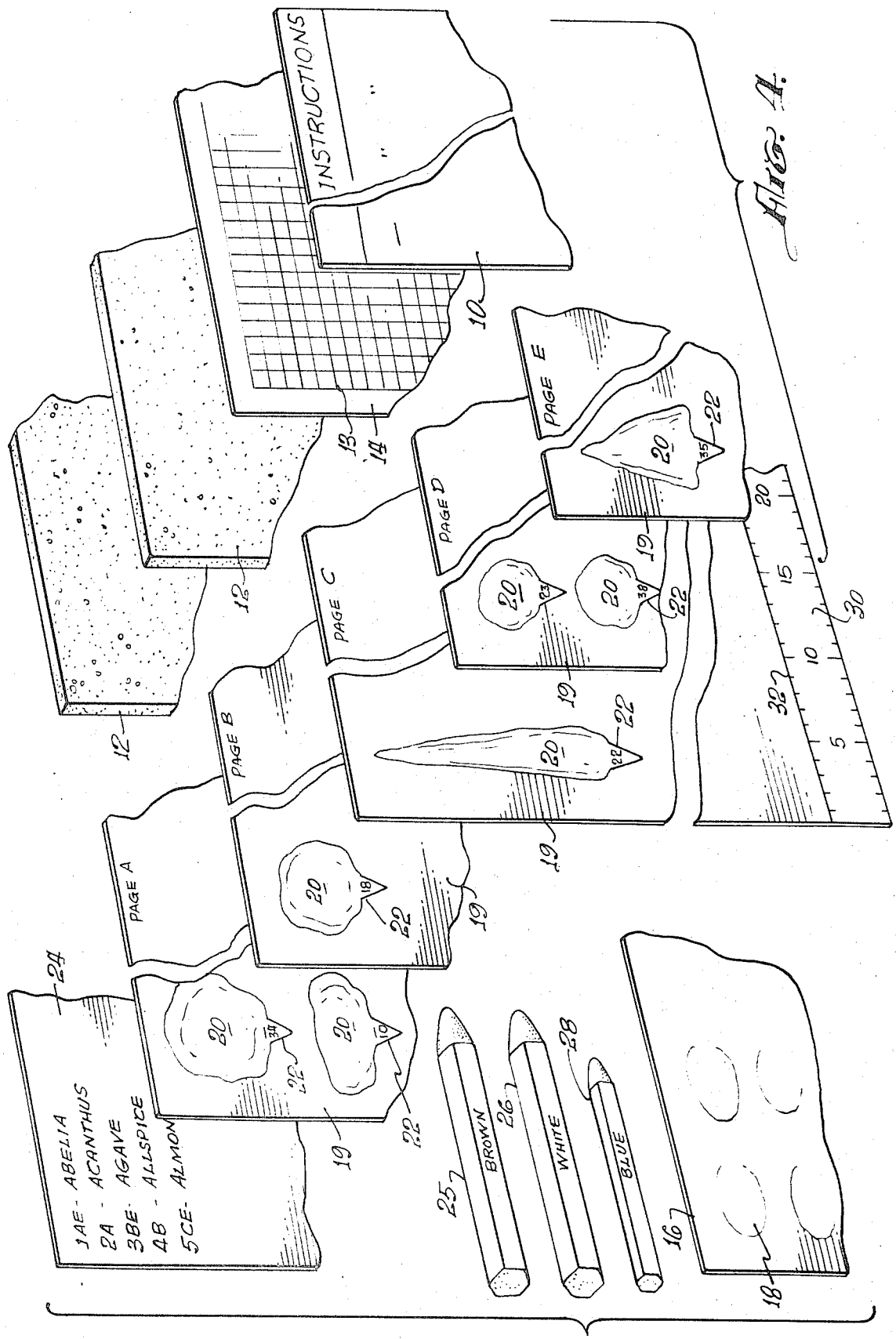

LANDSCAPE KIT

BACKGROUND OF THE INVENTION

Decisions involved in arriving at landscaping plans are based on mental visualization of the future result of proposed plantings. A home owner who undertakes to landscape his property is handicapped in making such decisions by insufficient knowledge about what trees and shrubs are available and about their size, shape, color, and texture when fully grown. The problem is to arrive at accurate mental visualizations, and mere lists and written descriptions of available plants are not adequate.

If a professional landscape architect undertakes to help the home owner, a well recognized semantic difficulty arises if the professional relies largely or entirely on words to communicate his own mental visualization of a proposed plan because words inevitably have different connotations for different individuals. The home owner may translate the verbal description into a mental image that has little in common with what the professional has in mind.

One approach to the problem is for the professional to submit a landscape plan on paper. Such a plan is quite expensive because it must be carefully made and accurately colored, but nevertheless the home owner must translate a two dimensional plan into a three dimensional visualization and the result cannot be a successful meeting of minds. A further difficulty is that such a paper plan is fixed and cannot be readily altered to depict various options that may be open.

Various proposals have been made in the prior art to meet this difficulty by providing kits that may be used for three dimensional physical representations of landscape plans. Such proposals are found, for example, in the following U.S. patents: Bole 2,305,567; Metz 2,508,925; Lewis et al., 2,526,569; and Selwin-Smith 3,078,616. These prior art disclosures, however, have serious limitations and shortcomings.

The Bole patent discloses a thick baseboard with parallel slots and parallel intersecting scale lines. Cardboard cutouts depicting shrubs and trees have flat base portions which fit into the slots. The spacing of the cutouts is limited to the spacing of the slots and there is no provision for showing non-rectangular areas and no provision for depicting cement sidewalks and driveways or fish ponds and swimming pools. There is no provision for showing non-rectangular planting areas and no provision for distinguishing between lawn areas and the bare ground of planting areas around shrubs and trees.

Metz employs full sized colored cutouts that are provided with base stakes that may be driven into the ground at the home owner's property. Obviously, it would not be practical for a home owner to buy or make even part of a complete set fo such full-scale cutouts and installing the cutouts is a major task.

The Lewis et al., patent discloses a baseboard which is inscribed with two intersecting sets of parallel lines on a given scale and cardboard cutouts have bent base portions to rest on the baseboard, the bent base portions of the cutouts having the same intersecting scale lines as the baseboard. The base portions of the cutouts mask the surface of the baseboard. A residence may be depicted by an upright cutout, but such a cutout does not provide any concept of the plan configuration of the residence. There is no provision for showing non-rectangular planting areas and no distinction in color between lawn areas and the bare earth of planting areas.

Selwin-Smith employs a baseboard with numerous apertures at predetermined locations and provides replicas of plants and shrubs that have base portions that may be stuffed into the apertures by means of a hand tool. Since the locations of the plant replicas are limited to the predetermined locations of the apertures, the kit is inherently incapable of accurately representing random landscape arrangements. Here again, there is no provision for showing non-rectangular areas and no provision for depicting a cement sidewalk, a cement driveway or swimming pool. There is no provision for distinguishing between lawn areas and planting areas.

SUMMARY OF THE INVENTION

A primary object of the present invention is to provide an inexpensive, versatile, small-scale kit that avoids all of the above discussed limitations of prior art kits. The kit of the present invention provides cutouts depicting a wide selection of available shrubs and trees in full photographed color. The cutouts are accurately dimensioned to scale and may be installed at any selected points on a base sheet that represents the area that is to be landscaped. The kit is highly flexible in that cutouts may be quickly and easily moved from location to location to illustrate different options. In the preferred practice of the invention the shrubs and trees are depicted by colored cardboard cutouts that are formed with base spikes and the base sheet that represents the landscape area is a relatively thick sheet into which the base spikes of the cutouts may be inserted at any selected locations.

A specific object of the invention is to provide such a kit that will realistically distinguish lawn areas, bare earth areas around plants, cement sidewalks and driveways, fish ponds and swimming pools and also the plan area of a house and garage. A feature of the invention is the concept of using a base sheet that is of green color to represent lawns and employing crayons of different colors to coat areas of the base sheet to represent cement areas, bare earth areas, and any swimming pool or fish pond that is in the landscaped area. The area occupied by a house and garage is represented by paper sheet material that is adhesively bonded to the surface of the base sheet.

In the preferred practice of the invention, the base sheet is made of suitable foamed plastic which may be either pierced by a cardboard spike of a plant cutout or may be pierced by a suitable flat bladed tool such as a nail file in preparation for insertion of a cardboard spike. In the initial practice of the invention the base sheet is made of foamed polystyrene and has a thickness of approximately 7/16 inch.

A further object of the invention is to acquaint a home owner with the important characteristics of a wide range of shrubs and trees that are available. For this purpose an extensive list of shrubs and trees is provided with appropriate helpful comments and the cardboard cutouts are provided with individual indicia which refer to identical indicia on the descriptive list.

The various features and objects of the invention may be understood by reference to the following detailed description and the accompanying drawings.

BRIEF DESCRIPTION OF THE DRAWINGS

In the drawings, which are to be regarded as merely illustrative:

FIG. 1 is a perspective view showing how components of the presently preferred embodiment of the kit may be assembled to produce a small scale model of a particular landscape plane;

FIG. 2 is a fragmentary perspective view showing how a cardboard replica of a shrub may be removed from a cardboard sheet of such replicas;

FIG. 3 is a fragmentary transverse section of the base sheet of FIG. 1 showing how a cardboard replica is supported in upright position by a stake portion of the replica penetrating the foamed plastic of the base sheet; and FIG. 4 is a perspective view largely cut away showing the components of the presently preferred embodiment of the kit.

DESCRIPTION OF THE PREFERRED EMBODIMENT OF THE INVENTION

FIG. 1 shows by way of example a kit assembled to represent a selected landscape plan and FIG. 4 shows the various components of the kit.

The components shown in FIG. 4 include: a sheet 10 of printed instructions; two base sheets 12 of green colored foamed plastic; a thin piece of suitably colored paper 14 having a grid 13 of intersecting scale lines for guidance in shearing the sheet to scale to represent the plan area of a residence and attached garage; a paper sheet 16 having a plurality of removable paper tabs 18, each tab having on its underside a removable coating of adhesive for use in attaching a residence cutout to a base sheet 12; five cardboard cutout sheets designated pages A-E respectively, each of which has a plurality of plant replicas in the form of cutouts 20 realistically colored to represent shrubs and trees, each plant cutout having a triangular spike 22 formed at its base end for insertion into the material of a base sheet 12; a sheet 24 listing available trees and shrubs with appropriate helpful comments; and a set of suitable crayons comprising a brown crayon 25, a white crayon 26 and a blue crayon 28 that are used to coat selective areas of a base sheet 12. The brown crayon is used to represent the bare earth of planted areas; the white crayon is employed to represent cement sidewalks, stepping stones and driveways; and the blue crayon is used to represent a swimming pool or a fish pond. One of the five cutout sheets A-E has a printed scale 30 along one of its margins, the cardboard sheet being weakened by a line of scoring 32 to permit the scale 30 to be detached for use.

The scale selected for the landscape model is ⅛ inch per foot and, accordingly, the grid 13 on the sheet 14 has its scale marks spaced apart by ⅛ inch and the graduations on the scale 30 are spaced apart ⅛ inch. The dimensions of a base sheet 12 are preferably 12 inches by 16 inches so that each base sheet at its full size may represent a lot 96 feet wide by 128 feet long. For a smaller lot, a portion of the base sheet is cut away and for a larger lot two base sheets may be bonded edge to edge to a cardboard base.

The individual plant cutouts 20 on the five cardboard cutout sheets A-E are provided with indicia for reference to the list of plants on sheet 24. In this instance the indicia are consecutive numerals. As shown in the drawings the reference numerals may be printed on the spikes 22 of the plant cutouts 20. The plants listed on sheet 24 have indicia that identify the plant cutouts 20 that represent the particular shrubs or trees. The indicia "1AE" opposite the plant name abelia on sheet 24 indicates that the plant cutouts 20 that represent abelia shrubs are designated by numeral 1 and such cutouts may be found on sheets A and E. In like manner, plant cutouts 20 representing acanthus have reference numerals 2 and are found on sheet A; cutouts 20 representing agave have reference numerals 3 and are found on sheets B and E.

The procedure for assembling the landscape model shown in FIG. 1 may comprise the following steps.

Using the scale 30, a base sheet 12 is cut to size to represent the ground area that is to be landscaped. For a relatively large lot, two of the base sheets 12 may be employed. With the guidance of the grid 13 the sheet 14 is trimmed to size to produce a cutout 33 representing the combined area of the residence and the garage that are represented in FIG. 1. The cutout 33 is then adhesively bonded to the base sheet 12 with the cutout spaced from the edges of the base sheet in accord with the actual distance of the combined residence and garage from the boundaries of the lot that is to be landscaped. The removable paper tabs 18 on the sheet 16 have a suitable viscous adhesive on their undersides. A tab 18 may be lifted from the sheet 16 and then the adhesive face of the tab may be pressed against the underside of the paper cutout 33 that represents the combined residence and garage. Monentary contact of the tab with the back of the cutout 33 transfers a substantial portion of the adhesive to the back of the sheet. Only a few dots of adhesive are necessary to anchor cutout 33 to the surface of the base sheet 12.

The next step is to measure concrete areas of the plot that is to be landscaped and to employ the white crayon 26 to coat the surface of the base sheet 12 to represent the concrete areas. If the concrete areas do not already exist and the kit is to be employed to explore various possibilities for locating such areas, it is advisable to use white paper cutouts to try out different locations of the concrete areas and then to use the white crayon when a final decision has been reached. In FIG. 1 the white crayon designates a cement walk 34 and a cement driveway 35.

If a swimming pool or a fish pond already exists the blue crayon may be employed to indicate its area on the base sheet. Here again, if the kit is to be employed to decide upon the location of a swimming pool or fish pond, a paper cutout may be employed and shifted from location to location until a final decision is reached. FIG. 1 shows a portion of the base sheet 12 colored with the blue crayon to indicate the location of a swimming pool 36.

Cutouts 20 representing the desired shrubs and trees are then removed from the sheets A-E and are installed on the base sheet by inserting the spikes 22 of the cutouts into the foamed plastic material of the base sheet 12. With care a spike 22 may pierce the foamed plastic material, but it is recommended that a flat blade be used to pierce the material of the base sheet in preparation for the insertion of the spike 22 of a cutout. FIG. 3 shows how a nail file 38, for example, may be employed for this purpose.

FIG. 1 shows various plant cutouts 20 mounted on the base sheet 12 to represent the shrubs and tress that have been selected for the landscape plan. The brown crayon 25 is employed to color ground areas around the trees or shrubs. Such ground areas are designated by numeral 40 in FIG. 1.

Since the plane cutouts 20 are accurate in both color and scale and since the base sheet 12 is colored green to represent lawn and since the crayons are employed to show concrete areas, bare earth areas, and water areas, the assembled model realistically represents the future appearance of the landscaped plot. It is a simple matter to transfer the plants cutouts 20 to different locations of the base sheet 12 for the purpose of changing the landscape plan.

The assembled model shown in FIG. 1 may be kept as a three-dimensional record of the landscape plan for future comparision with the landscaped area as the various plantings mature.

It is apparent that the kit may be used by a home owner to develop his own ideas of how a plot may be landscaped or the kit may be used by a nurseryman or a landscape architect to provide a home owner with a three-dimensional visualization of a proposed landscape plan.

My description in specific detail of the presently preferred practice of the invention will suggest various changes, substitutions and other departures from my disclosure within the spirit and scope of the appended claims.

I claim:

1. A kit for portraying a landscape plan for a given ground area on a reduced scale, comprising:
   a plurality of small scale replicas duplicating the appearance of different plants, said replicas having base spikes; and
   a base sheet of green foamed plastic material representing the given ground areas on a given scale,
   said replicas being dimensioned on the given scale,
   the base sheet having a minimum thickness sufficient to maintain the replicas in upright position when the base spikes of the replicas are inserted into the base sheet,
   said base sheet being capable of penetration anywhere in its area by a base spike or an equivalent tool to permit a base spike to be inserted into the base sheet.

2. A kit as set forth in claim 1 in which the base sheet is made of foamed polystyrene.

3. A kit as set forth in claim 1 which includes crayons to coat different portions of the area of the base sheet distinctively to represent different surface materials including cement surfaces of walks and driveways;
   and in which the base sheet has a rough open-cell surface to abrade the crayons to facilitate coating the base sheet by the crayons.

4. A kit as set forth in claim 1 in which the replicas are made of sheet material;
   in which the kit includes a list of names of plants corresponding to plants represented by the replicas;
   in which the names on the list are provided with indicia;
   and in which the replicas have corresponding indicia to permit the list to be used to identify the plants represented by the replicas.

5. A kit as set forth in claim 1 which includes means to apply distinctive coatings to different portions of the area of the base sheet to represent different surface materials including cement surfaces of walks and driveways.

6. A kit as set forth in claim 5 which includes an additional sheet to be trimmed to size to produce a cutout or cutouts on said given scale to represent a building or a plurality of buildings on the given ground area.

7. A kit as set forth in claim 6 in which the additional sheet is printed with a grid of lines spaced apart in accord with said given scale.

8. A kit as set forth in claim 6 which includes adhesive means to bond the building cutout or cutouts to the base sheet.

9. A kit as set forth in claim 1 in which the replicas are flat pieces of sheet material colored to simulate the appearance of the corresponding plants, the sheet material being of sufficient rigidity and strength for the spikes to maintain the duplicating members in upright position on the base sheet.

10. A kit as set forth in claim 9,
    which includes a plurality of sheets of frangible material;
    in which said replicas are partially severed cutouts of said sheets of frangible material;
    in which the sheets of frangible material have identifying indicia;
    and in which the names on said list of names of plants have indicia referring to the frangible sheets on which the corresponding cutouts may be found.

11. A kit as set forth in claim 10 in which one of said sheets of frangible material has a ruler printed thereon, the scale of the ruler being said given scale.

12. A kit as set forth in claim 11 in which said one of the sheets of frangible material is weakened by scoring to facilitate separation of said ruler from the sheet.

13. A kit for portraying a landscape plan for a given ground area on a reduced scale, comprising:
    a plurality of small scale replicas duplicating the appearance of different plants, said replicas having base spikes;
    a base sheet representing the given ground area on a given scale,
    the base sheet having minimum thickness sufficient to maintain the replicas in upright position when the base spikes of the replicas are inserted into the base sheet,
    said base sheet being capable of penetration anywhere in its area by a base spike or an equivalent tool to permit a base spike to be inserted into the base sheet; and
    means to apply distinctive coatings to different portions of the area of the base sheet to present different surface materials including cement surfaces of walks and driveways,
    said means to apply distinctive coatings comprising crayons of different colors to be rubbed onto the surface of the base sheet.

14. A kit as set forth in claim 13 in which the base sheet is colored green to simulate a lawn and the distinctive coatings include a brown coating to simulate bare earth areas around the replicas.

* * * * *